United States Patent [19]
Strickland et al.

[11] Patent Number: 5,146,167
[45] Date of Patent: Sep. 8, 1992

[54] METHOD AND APPARATUS FOR DETERMINING THE CONDUCTIVITY OF SUBSURFACE EARTH FORMATIONS BY FILTERING AND SUMMING IN-PHASE AND QUADRATURE CONDUCTIVITY SIGNALS WITH CORRECTION VALUES

[75] Inventors: Robert W. Strickland, Austin; Paul L. Sinclair, Clear Lake Shores, both of Tex.

[73] Assignee: Halliburton Logging Services, Inc., Houston, Tex.

[21] Appl. No.: 708,142

[22] Filed: May 30, 1991

[51] Int. Cl.$^5$ .......................... G01V 3/18; G01V 3/38
[52] U.S. Cl. ..................... 324/339; 364/422
[58] Field of Search ............... 324/339, 340, 341, 342, 324/343; 364/422

[56] References Cited
U.S. PATENT DOCUMENTS
4,513,376  4/1985  Barber ................. 324/339

*Primary Examiner*—Walter E. Snow
*Attorney, Agent, or Firm*—William J. Beard

[57] ABSTRACT

An improved induction well logging processing technique for determining conductivity measurements of subsurface earth strata. An in-phase conductivity signal and a quadrature conductivity signal are obtained from a downhole induction logging tool. The in-phase conductivity signal and the cubed square root of the in-phase conductivity signal are filtered by a first filter and a second filter, respectively. The outputs of the filters may be summed to provide a first conductivity signal having reduced environmental effects and indicating the conductivity of the earth formation under test. Additionally, the in-phase conductivity signal and the quadrature signal may be filtered and summed to provide a second conductivity signal. A weighted average of the first and second conductivity signals may be used as an indication of the earth formation conductivity.

28 Claims, 4 Drawing Sheets

METHOD AND APPARATUS FOR DETERMINING THE CONDUCTIVITY OF SUBSURFACE EARTH FORMATIONS BY FILTERING AND SUMMING IN-PHASE AND QUADRATURE CONDUCTIVITY SIGNALS WITH CORRECTION VALUES

BACKGROUND OF THE INVENTION

The present invention is directed to a technique for investigating characteristics of subsurface earth strata. More particularly, the present invention relates to a technique for determining the electrical conductivity of earth formations with an induction well logging tool.

Various techniques for investigating the conductivity of subsurface earth formations have been developed. One such technique, referred to as induction logging, was first introduced in 1949 by Henri G. Doll, "Introduction to Induction Logging and Application to Logging of Wells Drilled with Oil Base Mud," *Journal of Petroleum Technology*, Vol. 1, No. 6, June 1949, pp. 148–162. U.S. Pat. No. 2,582,314 was issued Jan. 15, 1952 and related to the basic Doll induction logging system.

Briefly, an induction logging tool employs at least one transmitter/receiver coil pair. Typically, the transmitter coil is excited by an oscillating current at a frequency on the order of 20 KHz. The resultant magnetic field generates eddy currents in the earth formation which, in turn, produce a second magnetic field. The second magnetic field generates voltage signals across the receiver coil, which are then processed to obtain values for the earth conductivity (or the inversely related resistivity). The conductivity values are recorded as a function of the tool depth.

Over the years attempts have been made to improve the accuracy of conductivity measurements obtained with an induction logging tool. For example, considerable efforts have been made in an attempt to minimize the effects on the conductivity measurement caused by environmental factors such as the shoulder effect and the skin effect. Briefly, the shoulder effect is the distortion of measured data at the measure point caused by different conductivities in formation beds remote from the measure point. The skin effect relates to distortion of the measurement due to the detection of magnetic fields resulting from eddy currents in the formation which, in turn, were produced by magnetic fields generated by other eddy currents in the formation. The design of the coil array can help reduce the impact of the environmental effects. However, such an approach to reducing undesirable effects limits flexibility in coil array design.

In order to avoid unduly constraining the design of the induction logging coil array, many attempts at reducing environmental effects on the conductivity measurement focus on the techniques employed in processing the voltage signals detected by the receiver coil. The technique described by Doll, which may be described as the geometric factor theory, does not account for the skin effect. One processing technique intended to correct for the skin effect is disclosed in U.S. Pat. No. 3,147,429 issued Sep. 1, 1964 to James H. Moran. The induction logging tool disclosed by Moran utilizes a phase sensitive detector keyed to the transmitter coil current to obtain both an in-phase receiver signal (the "$V_R$ signal") and a quadrature phase detector signal (the "$V_X$ signal"). In the disclosed embodiment, the $V_X$ signal is modified by the $V_X$ signal to obtain an indication of the formation conductivity which should have reduced skin effect. This technique, however, has various shortcomings. For example, the quadrature signal often exhibits instability in certain formations. This instability may be difficult to estimate and leads to questionable accuracy of the final conductivity measurements.

Other processing techniques have been described in the technical and patent literature. A technique often designated "phasor processing" is described in U.S. Pat. Nos. 4,467,425 and 4,471,436 to Richard T. Schaefer et al, and U.S. Pat. No. 4,513,376 to Thomas D. Barber. Additional techniques for obtaining conductivity measurements with an induction logging tool are disclosed, for example, in Suresh G. Thadani et al., "Deconvolution With Variable Frequency Induction Logging Systems," *SPWLA 24th Annual Logging Symposium*, Paper II, June 1983; J. H. Moran et al, "Induction Logging—Geometrical Factors With Skin Effect", *The Log Analyst*, Vol. 23, No. 5, Nov.-Dec. 1982, pp. 4–10; B. Anderson, "Induction Sonde Response in Stratafied Media," *The Log Analyst*, Vol. 24, No. 1, Jan.-Feb. 1983, pp. 25–31; O. Serra, "Diagraphies Differees—Bases de l'Interpretation. Tome 1: Acquisition des Donnees Diagraphiques," Bulletin des Centres de Recherches Exploration-Production Elf-Aquitaine, Memoire 1, 1979, p. 92; C. F. George et al, "Application of Inverse Filters to Induction Log Analysis," *Geophysics*, Vol. 24, No. 1, February 1964, pp. 93–104; and T. D. Barber et al, "Introduction to the Digital Dual Induction Tool," *Trans. of the 58th Annual Tech. Conf. and Exhibition of the SPE of AIME*, SPE Paper No. 12049, Oct. 5-8, 1983.

All of the induction logging techniques noted above have various shortcomings which reduce their effectiveness in certain conditions. Accordingly, there is a need for an induction well logging system which provides improved conductivity measurements over a large range of formation conductivities.

BRIEF SUMMARY OF THE INVENTION

It is an object of the present invention to provide an improved processing technique for induction well logging systems. It is a further object of the present invention to obtain formation conductivity indications having reduced shoulder and skin effects. These and other objects may be obtained with the present invention as described below in a preferred embodiment.

In accordance with the preferred embodiment, the present invention provides an improved technique for processing induction well logging signals to determine the conductivity of subsurface earth formations. An in-phase conductivity signal may be measured by the induction logging coil array. This in-phase conductivity signal is then applied to a first nonlinear spatial filter. A function of the in-phase conductivity signal, for example the conductivity signal raised to the 3/2 power, may be applied to a second filter. The filtered values may then be summed to provide an improved conductivity measurement.

In accordance with another aspect of the preferred embodiment, an in-phase conductivity signal and a quadrature conductivity signal may be detected by a well logging tool arranged in a borehole. The in-phase conductivity signal is filtered with a first filter and the quadrature conductivity signal is filtered with a second filter. The in-phase conductivity signal and a function of the in-phase conductivity signal are also filtered by a third filter and a fourth filter, respectively. The outputs of the first and second filters are summed to obtain a first summed value. Similarly, the outputs of the third and fourth filters are summed to obtain a second summed value. An output conductivity signal may then be determined as a function of the first and second summed values and the in-phase conductivity signal.

BRIEF DESCRIPTION OF THE DRAWINGS

The objects, advantages and features of the present invention will be apparent from the following detailed description of the preferred embodiment when read with reference to the accompanying drawings, wherein.

DETAILED DESCRIPTION OF THE PREFERRED EMBODIMENT

The preferred embodiment of the present invention is described below in detail. It will be appreciated, however, that modifications can be made to the preferred embodiment without departing from the present invention.

Figure 1:
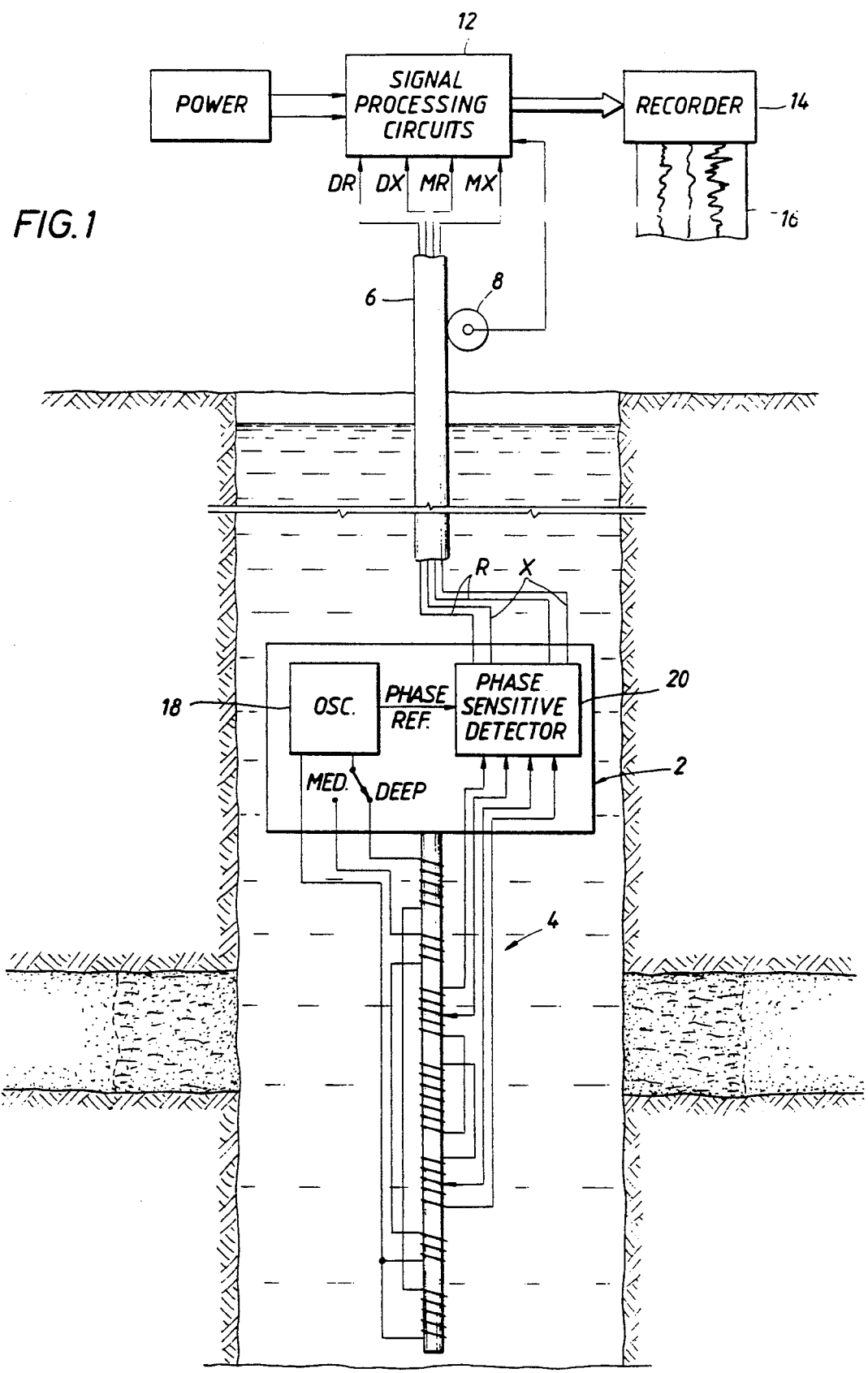
FIG. 1 is a schematic drawing illustrating an induction well logging system for investigating the conductivity of subsurface earth formations.

An induction well logging system in accordance with the preferred embodiment of the present invention is shown schematically in FIG. 1. A downhole logging sonde having downhole electronics 2 and coil array 4 is placed in a borehole and is connected to the earth surface by a logging cable 6. The logging sonde may be moved up and down the borehole with a conventional winch 8 which operates in a standard manner to produce a depth signal indicating the position of the sonde in the borehole. A signal processing circuit 12, which may be in the form of a general purpose computer, is coupled electrically with the logging sonde by logging cable 6.

In operation, the signal processing circuit 12 receives detected conductivity values from the logging sonde and processes the measured values to correct for environmental effects such as shoulder effect and skin effect. Corrected conductivity values may then be recorded as a function of depth on magnetic tape recorder 14 and a printed log of the corrected conductivity values may be recorded on well log 16. Preferably, the measured raw conductivity values are also recorded on magnetic tape.

The induction logging system preferably utilizes a dual induction logging tool adapted to investigate earth formations at different radial distances from the borehole. Accordingly, the coil array 4 preferably includes a plurality of transmitter and receiver coils arranged on an insulating mandrel. A particularly advantageous dual induction coil array is disclosed in commonly owned co-pending U.S. patent application Ser. No. 07/604,542 filed Oct. 29, 1990 now U.S. Pat. No. 5,065,099 by Paul L. Sinclair and Robert W. Strickland, which is hereby incorporated by reference. Briefly, the aforementioned patent application describes a dual induction tool having two symmetrical coil arrays which provide both a medium radial depth-of-investigation conductivity measurement and a deep radial depth-of-investigation conductivity measurement. The inherent vertical resolution of the two symmetrical coil arrays is substantially equal.

In operation, the deep measurement transmitter coils and the medium investigation transmitter coils are energized by oscillator 18 at a frequency of 20 KHz during alternate 50 millisecond intervals. The energized transmitter coils generate electric currents in the earth formation which, in turn, generate voltages across the receiver coils. The receiver coils are connected to amplifying and detecting circuits in receiver circuits 20 at the appropriate time. The receiver circuits 20 include conventional phase-sensitive detectors which operate in a known manner to detect both the in-phase and quadrature receiver coil voltages for the medium radial depth measurement and the deep radial depth measurement. The in-phase receiver voltage signals may be referred to as R-signals and the quadrature voltage signals may be referred to as X-signals. These detected R-signals and X-signals are then telemetered uphole over logging cable 6 for further processing by signal processing circuit 12.

Figure 3:
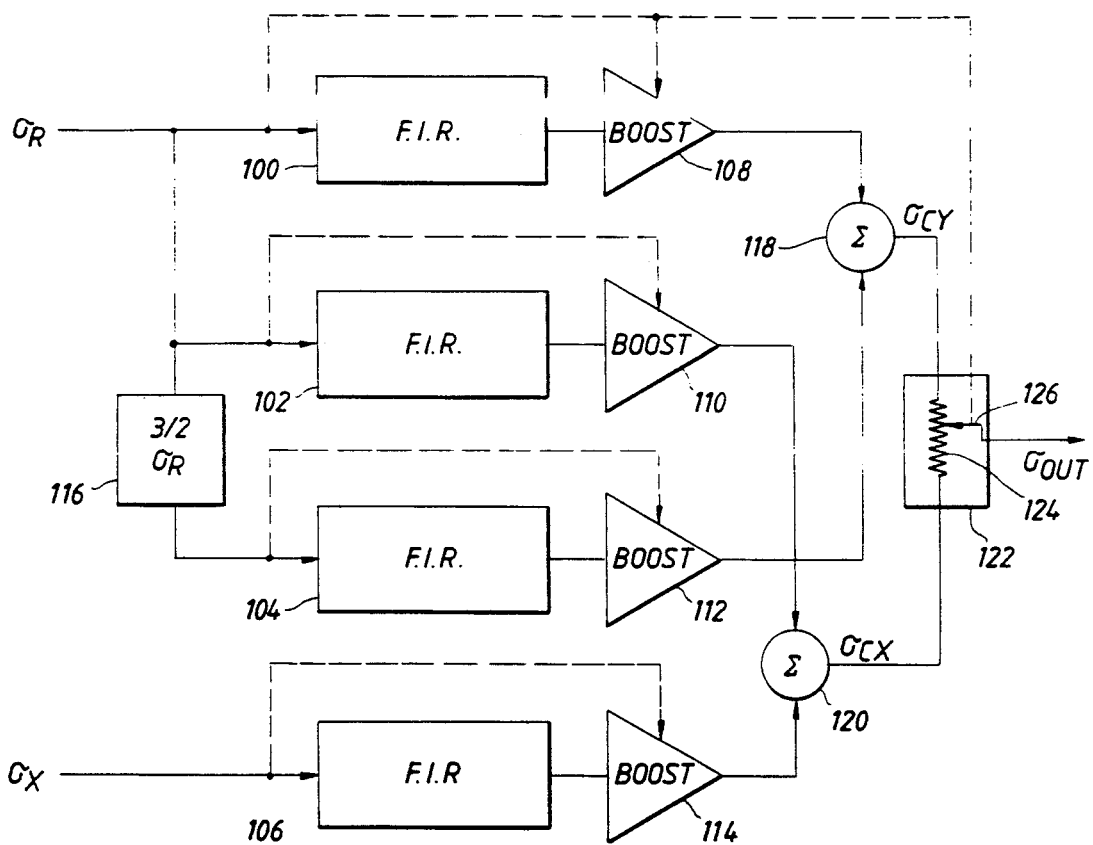
FIG. 3 is a block diagram illustrating a circuit for processing detected conductivity values from an induction well logging tool in accordance with the present invention.
Figure 4:
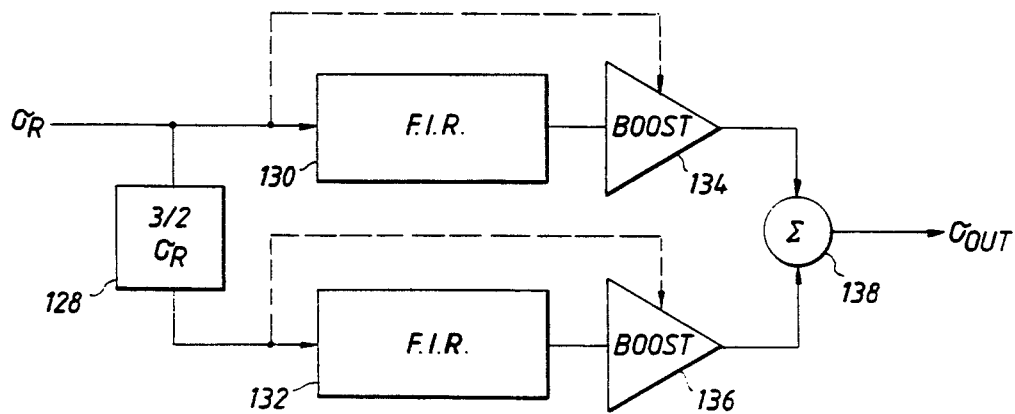
FIG. 4 is an additional block diagram of circuitry for processing detected conductivity values in accordance with the present invention.

The operation of the signal processing circuit 12 in accordance with the present invention will be described in greater detail with reference to FIGS. 3 and 4. It should be appreciated that the circuits shown in FIGS. 3 and 4 are intended to clarify the operation of the signal processing circuit 12. In an actual implementation of the preferred embodiment, signal processing circuit 12 may be a general purpose computer with the functions of the circuits shown in FIGS. 3 and 4 implemented in software. Additionally, it should be noted that the processing circuitry need not be located uphole. For example, all or portions of the processing scheme may be performed downhole.

In the preferred embodiment of the present invention, an adaptive signal processing technique is employed that permits real time automatic correction of induction log environmental effects such as the skin effect and the shoulder effect. Previous processing techniques employed both the R-signal and the X-signal from the well logging tool to perform simultaneous shoulder and skin effect corrections in real time. However, in formations with high resistivity values, the X-signal is often unreliable because of the effects of contrast between the magnetic permeability of the borehole and the formation. This contrast may produce significant static and dynamic borehole effects on the X-signal that are often difficult to estimate. Additionally, sonde error instability affects the X-signal more than the R-signal signal. Temperature effects are also more repeatable on the R-signal signal than on the X-signal. Although a large portion of the X-signal instability related to direct mutual coupling between the transmitters and the receivers may be alleviated with proper sonde construction techniques, some X-signal instability remains.

Previous processing techniques relied more heavily on the X-signal in regions of high conductivity. The unknown, small offsets in the X-signal are relatively less important when the formation conductivity is high. Conventional wisdom is that skin effect, and therefore the X-signal, is negligible in high resistivity formations.

Attempts to roll off the X-signal gradually below a certain conductivity threshold or to completely ignore the X-signal in high resistivity zones have run into various problems. The present invention, however, overcomes these problems and provides a processing technique that minimizes adverse effects associated with X-signal instability.

As indicated by J. H. Moran et al., "Basic Theory of Induction Logging and Application to Study of Two-Coil Sondes," Geophysics, Vol. 27, No. 6, Part I, Dec. 1962, pp. 829-858, for a two coil sonde in a homogeneous medium, the portion of the voltage induced in the receiver coil in phase with the current in the transmitter coil, i.e. the R-signal, may be expressed $$-V_R = K\sigma \left(1 - \frac{2}{3}\frac{L}{\delta} + \ldots \right) \qquad (1)$$

where K is the sensitivity constant of the tool, L is the transmitter-to-receiver spacing and $\delta$ is the skin depth that is inversely proportional to the square root of the formation conductivity. The second and omitted terms correspond to what is termed the skin effect. Similarly, the quadrature component of the receiver voltage, i.e. the X-signal, can be written as $$V_X = K\sigma \frac{\delta^2}{L^2}\left(1 - \frac{2}{3}\frac{L^3}{\delta^3} + \ldots \right) \qquad (2)$$

Since $\delta^2$ is proportional to $1/\sigma$, the first term is a constant and represents the direct mutual coupling of the transmitter to receiver that may be nulled with additional coils in multiple coil arrays.

The relation for the R-signal signal can be rewritten in units of apparent conductivity as $$\sigma_R \approx \sigma(1 - C\sigma^{\frac{1}{2}}) \qquad (3)$$

or $$\sigma_R \approx \sigma - C\sigma^{3/2}. \qquad (4)$$

Likewise, if mutual coupling is ignored, the relation for the X-signal can be rewritten in units of conductivity as $$\sigma_x \approx C\sigma^{3/2}. \qquad (5)$$

Since the error due to skin effect and the X-signal both vary as $\sigma^{3/2}$, in thick beds, $$\sigma \approx \sigma_R + \sigma_X \qquad (6)$$

may provide a fairly good correction for skin effect. Such a correction is suggested in U.S. Pat. No. 3,147,429 to J. H. Moran. In thin beds, however, the X-signal and the skin effect error signal have different vertical responses. Furthermore, shoulder effect correction is still necessary. A known processing technique called phasor processing uses a convolution filter on the R-signal and a separate convolution filter on the X-signal to match the vertical response of the X-signal to that of the skin effect signal (after the skin effect signal is processed with the R-signal filter)

$$\sigma_P = \Sigma a_j \sigma_{Rj} + g(\sigma_X)\Sigma b_j \sigma_{Xj} \qquad (7)$$

The convolution filter a shapes the response in high resistivity zones to reduce shoulder effect. The filter b shapes the X-signal to have the same spatial response as the error in the first term due to skin effect. The boosting function g makes the tool read correctly in thick beds. In other words, the boosting function g accounts for neglected higher order terms in the skin effect expansion and accounts for the fact that a multiple coil sonde is being used. Phasor processing has the disadvantage of requiring the X-signal and the accompanying instabilities described above even in zones of high resistivity where there is little skin effect.

In view of previous difficulties encountered due to over-reliance on the X-signal, the present invention corrects for skin effect and shoulder effect with minimal reliance on the X-signal. Since the tool measures the R-signal $\sigma_R$ but $\sigma$ is desired, Equation 4 should be solved for $\sigma$. For high resistivities, to first order $\sigma_R \approx \sigma$, so a second order approximation to $\sigma$ is $$\sigma \approx \sigma_R + C\sigma_R^{3/2} \qquad (8)$$

This provides fairly good skin effect correction in thick beds of high resistivity. In thin beds, however, this formula is less effective because the skin effect portion of $\sigma_R$ and $\sigma_R^{3/2}$ have different vertical responses. Also, in more conductive formations, the level of $C\sigma_R^{3/2}$ should be adjusted so that the processed logs read correctly in thick beds. Processing in accordance with the following formula accounts for these differences:

$$\sigma_{CY} = f(\sigma_R)\Sigma a_j \sigma_{Rj} + g(\sigma_R^{3/2})\Sigma b_j \sigma_{Rj}^{3/2} \qquad (9)$$

Conceptually the convolution filter a corrects for most of the shoulder effect and the filter b matches the vertical response of $\sigma_R^{3/2}$ to the residual skin and shoulder effect of the first term. Preferably, however, the filters a and b are determined simultaneously and work in concert to correct for shoulder effect. The boosting functions f and g account for nonlinearities and help the tool read correctly in thick beds. In the following discussions, $\sigma_R^{3/2}$ will be referred to as the Y-signal.

As true formation conductivity increases, the second and higher order terms in the expansion of the R-signal dominate. Accordingly, after a point an increase in conductivity results in a decrease in apparent R-signal conductivity. Although the X-signal suffers from the same effect, its maximum apparent conductivity occurs at a higher true conductivity than does the R-signal. Therefore, in regions near the maximum R-signal, the Y-signal becomes a less accurate estimate of the skin effect. In these regions, the X-signal may be used. Thus, in regions of low formation resistivity, the following formula may be used:

$$\sigma_{CX} = f'(\sigma_R)\Sigma a'_j \sigma_{Rj} + g'(\sigma_X)\Sigma b'_j \sigma_{Xj} \qquad (10)$$

The coefficients for the filters in Equation 10 differ from those of Equation 9. The convolution filters a and b and the boosting functions f and g in Equation 10 have been given primes to indicate that they differ from the filters and boosting functions of Equation 9. Since the scheme outlined in Equation 10 needs to operate only in low resistivity zones, its response in high resistivity zones can be ignored. Thus, the filters and boosting functions may be based on simulated logs and, unlike previous processing techniques, need not be based on special case situations such as zero conductivity which may be somewhat unrealistic in actual well logging environments. A preferred procedure for determining the filter coefficients and the boosting functions is discussed below.

As discussed above, two different processing schemes are desired for two different environments. It is desirable to switch smoothly between the two different processing schemes as the environment changes. Studies indicate there is a significant resistivity range where both processing techniques work well. The overlapping ranges of effectiveness for the two processing schemes eases the transition between them. In accordance with one feature of the present invention, to accomplish the smooth transition between the two processing schemes, the total conductivity range is divided into three smaller ranges separated by two resistivity thresholds. The raw R-signal is preferably used to determine the conductivity region in which the tool is logging. As will be discussed below in greater detail, in high resistivity zones the R-signal and the Y-signal are used in the processing scheme, in low resistivity zones the R-signal and the X-signal are used in the processing scheme, and in intermediate resistivity zones a weighted average of the results of processing in accordance with Equation 9 and the results of processing in accordance with Equation 10 is used.

The weight used in the weighted average is preferably based on the raw R-signal so that it is known which processing scheme to use before processing begins. The composite weighted average of the two processing schemes can be expressed mathematically as:

$$\sigma_{C_c} = p\sigma_{CX} + (1-p)\sigma_{CY} \tag{11}$$

where $p = p(\sigma_R)$ is a function of the raw R-signal and varies smoothly from zero to one over a narrow resistivity range. The particular function $p(\sigma_R)$ will be discussed below. Preferably, if p is very small, $\sigma_{CX}$ is not calculated and the Y-signal processing described mathematically in Equation 9 is used. If p is nearly one, $\sigma_{CY}$ is not computed and the processing described in Equation 10 is used. Otherwise, the processing scheme described mathematically in Equation 11 is used.

In order to determine the filter coefficients $a_j$ and $b_j$ and the boosting functions f and g for the processing methods described above, processed test logs may be manipulated by adjusting the filter coefficients and boosting functions to minimize the difference between the test log and a target log. Preferably a standard nonlinear least squares problem solver is used in a known manner to find simultaneously the unknown $a_j$, $b_j$, f and g. The problem solver may receive as input target logs and raw induction log data obtained with the coil system for which the processing is intended. Preferably, the raw logs are converted to units of apparent conductivity but have not been corrected for skin effect or shoulder effect. The target logs may be determined in advance and saved on computer disks or the like.

Various techniques may be used to determine the raw log data and the target logs. For example, in determining the raw log data, a computer program which models the coil array response in layered formations may tabulate in a standard manner the raw response of the tool to a standard resistivity profile shifted to several levels of resistivity. Alternatively, actual measurements taken in test pits or the like may be used to generate the raw log data. Another computer program may be used to calculate target logs from true, rectangular profiles by convolving the true profiles with a gaussian ($e^{-X^2}$) filter. This convolution blurs the target logs to define the response at bed boundaries, minimize ringing, and match the vertical response of deep and medium investigation coils.

Using a program that accurately simulates the tool response avoids the artificial constraints of an approximate geometrical factor theory and allows the freedom to simulate the tool in as much detail as necessary. This could be extended to dipping beds by using a computer program that models the tool in digging beds to compute and tabulate raw logs.

The raw induction log data is processed in accordance with a first set of filter coefficients and boosting functions. The problem solver then determines the difference between the processed log and the target logs. The values assigned to the filter coefficients and boosting functions are then modified and the raw data is reprocessed using the modified values. This process is repeated to minimize the difference between the processed logs and the target logs along the length of a model formation. The filter coefficients and boosting functions which provide the best fit between the target logs and the processed logs may then be assigned for actual log processing.

A similar optimization procedure may be used to find the interpolating function p. The optimization program first corrupts the raw X-signal log with a uniformly distributed random error that can be either positive or negative at a particular depth. The user may select the maximum absolute value of this error. A functional form for p is assumed, and an optimization program finds the coefficients that minimize the error on the processed log. The user then runs the program repeatedly with increasing error on the X-signal until the results begin to deteriorate. This results in the maximum tolerance of X-signal errors. Preferably, processing with the X-signal is avoided in situations where the X-signal maximum error tolerance is exceeded.

Figure 5:
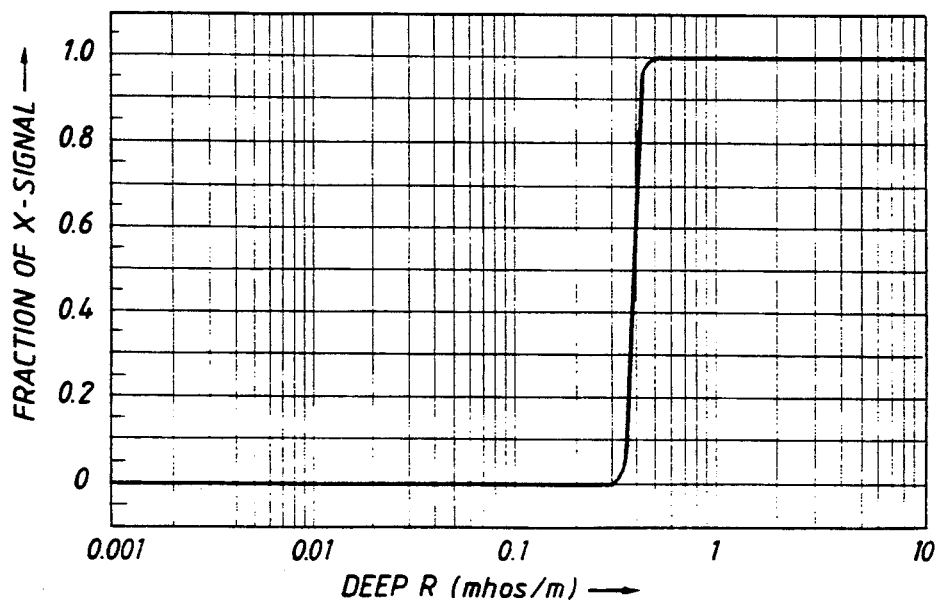
FIG. 5 is a plot of a preferred blending function which may be used in accordance with the present invention.

The preferred interpolation function may be expressed mathematically as follows:

$$p(\sigma_R) = \tfrac{1}{2} + \tfrac{1}{2}\tanh(15.72[ln(\sigma_R) + 0.972]) \tag{12}$$

where $\sigma_R$ is the raw R-signal in mhos/m, tanh is the hyperbolic tangent function and ln is the natural (base e) logarithm. A plot of Equation 12 is shown in FIG. 5. As shown, $p(\sigma_R)$ approaches either 0 or 1 over most of the range of values for $\sigma_R$, and the transition between 0 and 1 is relatively steep.

The choice of a narrow transitional resistivity range is preferred but not necessary. Since resistivity logs are generally presented on a logarithmic scale, use of any of the X-signal can produce a significant error in high resistivity regions since even a small error in conductivity can be a large percentage of the final result. In low resistivity it is desired to use more of the X-signal since this is the portion of the operating range where the R-signal may be double-valued. These are conflicting constraints which favor a quick transition. However, whatever interpolation function is used, and regardless of the transition rate, a smooth transition should be made to prevent the appearance of steps on the processed log.

For certain coil arrays, the Y-signal processing represented by Equation 9 may work effectively over the entire range of typical resistivities. In general, this is true when the tool operates with a relatively low transmission frequency. Additionally, such a situation is more likely to occur with coil arrays which provide a medium depth of investigation. Therefore, in some applications the blending performed by the interpolation function might not be necessary and the X-signal may be ignored. With medium depths of investigation, ignoring the X-signal has a further advantage since the X-signal is affected much more strongly by contrasts of magnetic permeability and X-signal instability.

The present invention may be practiced with an induction logging tool having a coil array capable of multiple depths of investigation. Such coil arrays are disclosed in the aforementioned copending U.S. patent application Ser. No. 07/604,542 filed Oct. 29, 1990 now U.S. Pat. No. 5,065,099 in the names of Paul L. Sinclair and Robert W. Strickland.

Figure 2:
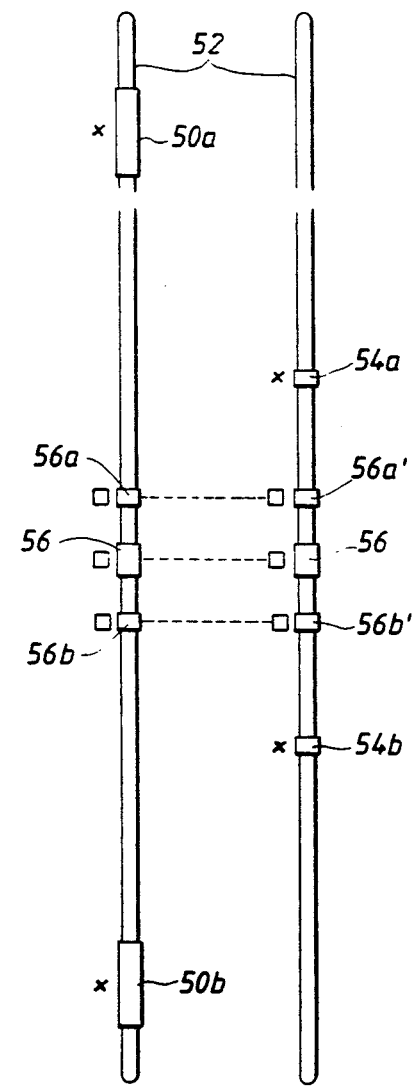
FIG. 2 is a schematic diagram of an induction well logging coil array which may be used in the practice of the present invention.

Turning now to FIG. 2, a coil array constructed in accordance with the copending Sinclair et al patent application is illustrated. For ease of illustration, the medium and deep investigation transmitter/receiver pairs of the coil array are shown on separate insulating mandrels. In the preferred embodiment, however, the medium and deep investigation coils share a common mandrel. Indeed, proper design permits common coils to be used as the receiver coils for both the medium and deep investigation coil arrays.

The deep investigation coil array includes a pair of transmitter coil 50a and 50b which are connected in parallel and arranged symmetrically about a central point on the insulating mandrel 52. Preferably, each of the deep transmitter coils 50a, 50b is arranged approximately seventy inches from the central point on the insulating mandrel 52, and has two hundred turns. The medium investigation coil array includes a pair of symmetrical transmitter coils 54a and 54b which are connected in series and each have a midpoint spaced approximately thirty inches from the central point. The medium transmitter coils are each provided with fifty turns.

The deep investigation coils could also be connected in series. However, connecting the deep investigation coils in parallel provides an impedance more similar to that of the medium investigation coils. Also, it is possible to connect both the medium and deep investigation coils in parallel, or the medium investigation coils in parallel and the deep investigation coils in series.

Common coils are used as the receiver for both the deep and medium investigation arrays. A main receiver coil 56 having seventy turns is arranged on the mandrel at the central point. For the deep investigation coil array, a symmetrical pair of bucking coils 56a, 56b is arranged about the central point. The bucking coils 56a, 56b are connected in series with the main receiver coil 56, but are wound in the opposite direction. Each of the bucking coils 56a, 56b is centered approximately nine inches from the central point and has twenty turns.

The same coils used as bucking coils 56a, 56b may be used as bucking coils for the medium investigation coil array. However, it is desirable to use fewer turns for the bucking coils of the medium investigation coil array. This is accomplished by providing each of the bucking coils 56a, 56b with a tap connected at an intermediate point on the respective coils. Preferably, the taps reduce the effective number of turns in the bucking coils to eleven. Reference characters 56a' and 56b' are used in FIG. 2 to indicate the tapped bucking coils used in the medium investigation coil array.

Referring again to FIGS. 3 and 4, signal processing circuitry in accordance with the present invention is shown for handling deep investigation logging signals and medium investigation logging signals, respectively. The deep processing circuitry includes finite impulse response (FIR) filters 100, 102, 104 and 106, and boosting function circuits 108, 110, 112 and 114.

The coefficients of the FIR filters 100, 102, 104 and 106 and the boosting functions implemented in boosting function circuits 108, 110, 112 and 114 are preferably determined in the manner described above. The following values may be used when the invention is practiced with the use of the coil array system described above in connection with FIG. 2 and measurements are made every half foot. Since, in the preferred embodiment, the coil arrays are symmetrical, the filters are also symmetrical. In the following tables, the first filter coefficient is repeated as the last coefficient. The only filter coefficient which is not mirrored is the center coefficient listed at the end of the third column in each table.

| FILTER COEFFICIENTS FOR FIR FILTER 100 | | |
|---|---|---|
| −.554900E−03 | −.756431E−04 | −.394692E−02 |
| −.604805E−03 | −.224802E−03 | −.382537E−02 |
| −.608941E−03 | −.302335E−03 | −.279703E−02 |
| −.549881E−03 | −.334104E−03 | −.659889E−03 |
| −.410196E−03 | −.361610E−03 | .229499E−02 |
| −.172460E−03 | −.426353E−03 | .565330E−02 |
| .161953E−03 | −.569834E−03 | .900073E−02 |
| .516459E−03 | −.809749E−03 | .119230E−01 |
| .795669E−03 | −.106858E−02 | .140536E−01 |
| .904199E−03 | −.124501E−02 | .152176E−01 |
| .746659E−03 | −.123773E−02 | .152880E−01 |
| .272425E−03 | −.945399E−03 | .141377E−01 |
| −.390088E−03 | −.315720E−03 | .116397E−01 |
| −.106770E−02 | .507594E−03 | .749629E−02 |
| −.158724E−02 | .133182E−02 | .726953E−03 |
| −.177552E−02 | .196423E−02 | −.981939E−02 |
| −.151932E−02 | .221210E−02 | −.252938E−01 |
| −.945246E−03 | .194342E−02 | −.461429E−01 |
| −.239850E−03 | .126904E−02 | −.699945E−01 |
| .410313E−03 | .360531E−03 | −.937720E−01 |
| .818689E−03 | −.610538E−03 | −.113931E+00 |
| .853326E−03 | −.147260E−02 | −.125053E+00 |
| .600696E−03 | −.208850E−02 | −.123912E+00 |
| .201873E−03 | −.245875E−02 | −.117908E+00 |
| −.202068E−03 | −.261824E−02 | −.115678E+00 |
| −.470052E−03 | −.260190E−02 | −.120184E+00 |
| −.499564E−03 | −.244463E−02 | −.130328E+00 |
| −.342332E−03 | −.219221E−02 | −.134443E+00 |
| −.886406E−04 | −.193381E−02 | −.171256E+00 |
| .171222E−03 | −.176950E−02 | −.139839E+00 |
| .346970E−03 | −.179932E−02 | .435727E−01 |
| .372086E−03 | −.212331E−02 | .989103E+00 |
| .275134E−03 | −.277063E−02 | .188370E+01 |
| .108447E−03 | −.348692E−02 | (Center of filter) |
| COEFFICIENTS FOR FIR FILTER 102 | | |
| −.278146E−02 | −.260427E−03 | .224391E−03 |
| −.226365E−02 | .109920E−03 | .946476E−03 |
| −.151804E−02 | .415474E−03 | .170656E−02 |
| −.708470E−03 | .672618E−03 | .250788E−02 |
| .124810E−05 | .915165E−03 | .344519E−02 |
| .447289E−03 | .117693E−02 | .463610E−02 |
| .519428E−03 | .149171E−02 | .619824E−02 |
| .321833E−03 | .187193E−02 | .824921E−02 |
| .122719E−04 | .224438E−02 | .108044E−01 |
| −.251489E−03 | .251444E−02 | .134706E−01 |
| −.311683E−03 | .258751E−02 | .157520E−01 |
| −.670042E−04 | .236897E−02 | .171532E−01 |
| .358016E−03 | .180451E−02 | .171786E−01 |
| .782385E−03 | .100093E−02 | .151113E−01 |
| .102511E−02 | .105333E−03 | .934928E−02 |
| .905197E−03 | −.735177E−03 | −.193095E−02 |
| .311025E−03 | −.137350E−02 | −.205528E−01 |
| −.591558E−03 | −.170369E−02 | −.470404E−01 |
| −.156733E−02 | −.178441E−02 | −.767214E−01 |
| −.238108E−02 | −.171548E−02 | −.103624E+00 |
| −.279759E−02 | −.159669E−02 | −.121722E+00 |

| | | |
|---|---|---|
| −.265693E−02 | −.152787E−02 | −.124771E+00 |
| −.210042E−02 | −.158381E−02 | −.111632E+00 |
| −.134467E−02 | −.173926E−02 | −.101803E+00 |
| −.606270E−03 | −.194395E−02 | −.110687E+00 |
| −.101839E−03 | −.214760E−02 | −.116665E+00 |
| .121892E−04 | −.229994E−02 | −.109850E+00 |
| −.179931E−03 | −.235858E−02 | −.164290E+00 |
| −.533773E−03 | −.231265E−02 | −.127876E+00 |
| −.904913E−03 | −.215916E−02 | −.166913E+00 |
| −.114892E−02 | −.189513E−02 | .718309E−01 |
| −.115724E−02 | −.151757E−02 | .956042E+00 |
| −.964764E−03 | −.102726E−02 | .177440E+01 |
| −.642240E−03 | −.440065E−03 | (Center of filter) |

COEFFICIENTS FOR FIR FILTER 104

| | | |
|---|---|---|
| .777054E−03 | .158555E−02 | .140302E−01 |
| .826074E−03 | .263386E−02 | .171621E−01 |
| .814763E−03 | .320200E−02 | .179186E−01 |
| .722129E−03 | .340440E−02 | .155559E−01 |
| .527179E−03 | .343408E−02 | .108987E−01 |
| .208919E−03 | .348408E−02 | .516407E−02 |
| −.223277E−03 | .374742E−02 | −.430968E−03 |
| −.638570E−03 | .432958E−02 | −.466938E−02 |
| −.875755E−03 | .498567E−02 | −.660856E−02 |
| −.773626E−03 | .538327E−02 | −.640354E−02 |
| −.170978E−03 | .518994E−02 | −.448378E−02 |
| .100431E−02 | .407323E−02 | −.127872E−02 |
| .246805E−02 | .185740E−02 | .278218E−02 |
| .384695E−02 | −.100657E−02 | .733692E−02 |
| .476773E−02 | −.391100E−02 | .122933E−01 |
| .485711E−02 | −.624822E−02 | .176266E−01 |
| .388211E−02 | −.741054E−02 | .233120E−01 |
| .217093E−02 | −.697620E−02 | .290675E 01 |
| .192085E−03 | −.526708E−02 | .335822E−01 |
| −.158593E−02 | −.279097E−02 | .352879E−01 |
| −.269461E−02 | −.556634E−04 | .353640E−01 |
| −.280936E−02 | .243105E−02 | .459806E−01 |
| −.218130E−02 | .425004E−02 | .719991E−01 |
| −.120543E−02 | .533672E−02 | .780551E−01 |
| −.276778E−02 | .571519E−02 | .425532E−01 |
| .209634E−03 | .540952E−02 | .391987E−01 |
| −.196535E−04 | .444380E−02 | .101106E+00 |
| −.751874E−03 | .293160E−02 | .372505E−02 |
| −.165270E−02 | .134449E−02 | .167571E+00 |
| −.238782E−02 | .243516E−03 | −.444795E−01 |
| −.262289E−02 | .189738E−03 | .241909E+00 |
| −.212575E−02 | .174421E−02 | −.198769E+00 |
| −.107288E−02 | .518512E−02 | −.736696E+00 |
| .257096E−03 | .965917E−02 | (Center of filter) |

COEFFICIENTS FOR FIR FILTER 106

| | | |
|---|---|---|
| −.832508E−05 | .366660E−02 | .719591E−02 |
| −.332327E−03 | .445592E−02 | .998396E−02 |
| −.657427E−03 | .448632E−02 | .116366E−01 |
| −.883961E−03 | .385978E−02 | .117345E−01 |
| −.912266E−03 | .275105E−02 | .105389E−0 |
| −.642678E−03 | .133488E−02 | .848134E−02 |
| −.302726E−04 | −.213966E−03 | .599309E−02 |
| .750924E−03 | −.172597E−02 | .350560E−02 |
| .147214E−02 | −.305257E−02 | .124734E−02 |
| .190462E−02 | −.405046E−02 | −.136492E−02 |
| .181959E−02 | −.457632E−02 | −.511731E−02 |
| .108993E−02 | −.448682E−02 | −.107960E−01 |
| −.493727E−05 | −.370633E−02 | −.191871E−01 |
| −.108393E−02 | −.242988E−02 | −.299073E−01 |
| −.176596E−02 | −.920154E−03 | −.378949E−01 |
| −.166997E−02 | .560135E−03 | −.369187E−01 |
| −.561943E−03 | .174829E−02 | −.207476E−01 |
| .120388E−02 | .244074E−02 | .120868E−01 |
| .312619E−02 | .267045E−02 | .440017E−01 |
| .470368E−02 | .252950E−02 | .526515E−01 |
| .543503E−02 | .211000E−02 | .248840E−01 |
| .496964E−02 | .150402E−02 | −.156791E−01 |
| .355961E−02 | .791425E−03 | −.418208E−01 |
| .160773E−02 | .306620E−05 | −.487166E−01 |
| −.483174E−03 | −.842433E−03 | −.395359E−01 |
| −.231032E−02 | −.172645E−02 | −.270310E−01 |
| −.354432E−02 | −.263037E−02 | −.165033E−01 |
| −.414943E−02 | −.349789E−02 | .261331E−01 |
| −.416332E−02 | −.412198E−02 | −.373339E−02 |
| −.362366E−02 | −.425792E−02 | −.525395E−01 |
| −.256814E−02 | −.366100E−02 | .198414E+00 |
| −.107180E−02 | −.208651E−02 | .187772E+00 |
| .640755E−03 | .571249E−03 | .591503E+00 |

| | | |
|---|---|---|
| .230755E−02 | .386187E−02 | (Center of filter) |

The boosting functions may also be expressed in terms of coefficients. Specifically, the boosting function $f_b(\sigma_R) = f_0 + f_1\sigma_R + f_2\sigma_R^2 + f_3\sigma_R^3 + f_4\sigma_R^4 + f_5\sigma_R^5$, where $\sigma_R$ is in units of mhos/m (Siemans/m), may be expressed as indicated below.

BOOSTING FUNCTION FOR BOOSTING CIRCUIT 108

$f_0 = 0.1000611E+01$
$f_1 = 0.2279439E+00$
$f_2 = 0.1375488E+01$
$f_3 = -0.7094565E+01$
$f_4 = 0.1065779E+02$
$f_5 = -0.4774344E+01$

BOOSTING FUNCTION FOR BOOSTING CIRCUIT 110

$f_0 = 0.9812724E+00$
$f_1 = 0.3880962E+00$
$f_2 = -0.1265608E+01$
$f_3 = 0.1934258E+01$
$f_4 = -0.1500072E+01$
$f_5 = 0.4505264E+00$

BOOSTING FUNCTION FOR BOOSTING CIRCUIT 112

$f_0 = 0.3963762E+00$
$f_1 = 0.1592843E-01$
$f_2 = 0.1487453E+01$
$f_3 = 0.3981490E+01$
$f_4 = -0.1050964E+02$
$f_5 = 0.5496215E+01$

BOOSTING FUNCTION FOR BOOSTING CIRCUIT 114

$f_0 = 0.1173629E+01$
$f_1 = 0.9573363E+00$
$f_2 = -0.1778546E-01$
$f_3 = -0.2563542E+00$
$f_4 = 0.1345032E+00$
$f_5 = -0.1637395E-01$

The input to FIR filter 104 passes through a calculating circuit 116 which determines the square root of the cube of an input signal. A first summing circuit 118 receives signals from the boosting function circuit 108 and boosting function circuit 112. A second summing circuit 120 receives signals from boosting function circuit 110 and boosting function circuit 114. The outputs of summing circuits 118 and 120 are provided to blending circuit 122.

In operation, the real conductivity signal R-signal from the logging tool is provided to FIR filters 100 and 102, to calculating circuit 116, and to control terminals of boosting function circuits 108 and 110 and blending circuit 122. The out-of-phase conductivity signal $\sigma_X$ is provided to FIR filter 106 and boosting function circuit 114. Y-signal processing, which is represented mathematically by Equation 9, is implemented by FIR filters 100 and 104, boosting function circuits 108 and 112, calculating circuit 116 and summing circuit 118. X-signal processing, which is represented mathematically by Equation 10, is implemented by FIR filters 102 and 106, boosting function circuits 110 and 114, and summing circuit 120. Blending circuit 122 performs the interpolation of the two processing schemes in the overlapping range of resistivities in which both schemes operate effectively. Outside of that resistivity range, the blending circuit 122 selects the appropriate one of the processing schemes.

The FIR filter 100 determines $\Sigma a_j\sigma_{Rj}$ and the boosting function circuit 108 determines $f(\sigma_R)$. Thus, the output signal of boosting function circuit 108 may be expressed as $f(\sigma_R)\Sigma a_j\sigma_{Rj}$, which is half of Equation 9. Similarly, FIR filter 104 determines $\Sigma b_j\sigma_{Rj}^{3/2}$ and the boosting function circuit 112 obtains $g(\sigma_R^{3/2})$. The output signal of boosting function circuit 112 may be expressed as $g(\sigma_R^{3/2})\Sigma b_j\sigma_{Rj}^{3/2}$, which is the other half of Equation 9. Hence, summing circuit 118 provides an output signal $\sigma_{CY}=f(\sigma_R)\Sigma a_j\sigma_{Rj}+g(\sigma_R^{3/2})\Sigma b_j\sigma_{Rj}^{3/2}$.

The FIR filter 102 determines $\Sigma a_j'\sigma_{Rj}$ and the boosting function circuit 110 determines $f'(\sigma_R)$. Thus, the output signal of boosting function circuit 110 may be expressed as $f'(\sigma_R)\Sigma a_j'\sigma_{Rj}$, which is half of Equation 10. Similarly, FIR filter 106 determines $\Sigma b_j'\sigma_{xj}$ and the boosting function circuit 114 obtains $g'(\sigma_X)$. The output signal of boosting function circuit 114 may be expressed as $g'(\sigma_X)\Sigma b_j'\sigma_{Xj}$—the other half of Equation 10. Summing circuit 120 provides an output signal $\sigma_{CX}=f'(\sigma_R)\Sigma a_j'\sigma_{Rj}+g'(\sigma_X)\Sigma b_j'\sigma_{Xj}$.

The blending circuit 122 may include a resistor 124 connected at one end with the output of summing circuit 118 and at the other end with summing circuit 120. A variable tap 126 is provided under the control of the R- signal. As noted above, the conductivity range may be divided into three ranges separated by two resistivity thresholds. In zones where the R-signal indicates high resistivity, the variable tap 126 would be adjusted so that the output signal $\sigma_{OUT}$ is equal to the $\sigma_{CY}$ output of summing circuit 118. In low resistivity zones, the variable tap 126 would be set so that the output signal $\sigma_{OUT}$ is equal to the $\sigma_{CX}$ output of summing circuit 120. In intermediate resistivity zones, the variable tap 126 is adjusted so that the output signal $\sigma_{OUT}$ includes contributions by both $\sigma_{CY}$ and $\sigma_{CX}$. Preferably, the control of variable tap 126 satisfies Equations 11 and 12 set forth above.

The processing scheme used for logging signals having a medium depth of investigation is illustrated schematically in FIG. 4. A calculating circuit 128 receives the R-signal from the logging tool and determines $\sigma_R^{3/2}$. The FIR filter 130 determines $\Sigma a_j''\sigma_{Rj}$ and the boosting function circuit 134 determines $f''(\sigma_R)$. Thus, the output signal of boosting function circuit 134 may be expressed as $f''(\sigma_R)\Sigma a_j''\sigma_{Rj}$. Similarly, FIR filter 132 determines $\Sigma b_j''\sigma_{Rj}^{3/2}$ and the boosting function circuit 136 obtains $g''(\sigma_R^{3/2})$. The output signal of boosting function circuit 136 may be expressed as $g''(\sigma_R^{3/2})\Sigma b_j''\sigma_{Rj}^{3/2}$. Hence, summing circuit 138 provides an output signal $\sigma_{OUT}=f''(\sigma_R)\Sigma a_j''\sigma_{Rj}+g''(\sigma_R^{3/2})\Sigma b_j''\sigma_{Rj}^{3/2}$. The double prime marks are used to indicate that the filter coefficients and boosting functions used in processing the medium depth of resolution logging signals differ from the coefficients and functions used for processing deep investigation logging signals.

The filter coefficients and boosting functions used for medium depth processing may be determined in the manner outlined above. The following filter coefficients and boosting functions may be used when the present invention is practiced with the coil array described above in connection with FIG. 2.

| COEFFICIENTS FOR FIR FILTER 130 | | |
|---|---|---|
| −0.203271E−02 | 0.654397E−03 | −0.537145E−04 |
| −0.136696E−02 | 0.925569E−03 | −0.508579E−03 |
| −0.521684E−03 | 0.869187E−03 | −0.919915E−03 |
| 0.311747E−03 | 0.571371E−03 | −0.122933E−02 |
| 0.941948E−03 | 0.167206E−03 | −0.143850E−02 |
| 0.117754E−02 | −0.208221E−03 | −0.156413E−02 |
| 0.897967E−03 | −0.419823E−03 | −0.162292E−02 |
| 0.266012E−03 | −0.372495E−03 | −0.163157E−02 |
| −0.484718E−03 | −0.131049E−03 | −0.159797E−02 |
| −0.112061E−02 | 0.199719E−03 | −0.149467E−02 |
| −0.140807E−02 | 0.515016E−03 | −0.128544E−02 |
| −0.118924E−02 | 0.710046E−03 | −0.934001E−03 |
| −0.609364E−03 | 0.709141E−03 | −0.404115E−03 |
| 0.110543E−03 | 0.553128E−03 | 0.188752E−03 |
| 0.749475E−03 | 0.311961E−03 | 0.122228E−03 |
| 0.108642E−02 | 0.555931E−04 | −0.147779E−02 |
| 0.969448E−03 | −0.146024E−03 | −0.548539E−02 |
| 0.522895E−03 | −0.241456E−03 | −0.116276E−01 |
| −0.598202E−04 | −0.253355E−03 | −0.150428E−01 |
| −0.585283E−03 | −0.222889E−03 | −0.972243E−02 |
| −0.860079E−03 | −0.191229E−03 | 0.720253E−02 |
| −0.751565E−03 | −0.199545E−03 | 0.260427E−01 |
| −0.370190E−03 | −0.273854E−03 | 0.360286E−01 |
| 0.112824E−03 | −0.379556E−03 | 0.346286E−01 |
| 0.526254E−03 | −0.466898E−03 | 0.140897E−01 |
| 0.698879E−03 | −0.486127E−03 | −0.624653E−01 |
| 0.515652E−03 | −0.387489E−03 | −0.200011E+00 |
| 0.862266E−04 | −0.143449E−03 | −0.246789E+00 |
| −0.423568E−03 | 0.184660E−03 | −0.333541E+00 |
| −0.847903E−03 | 0.513288E−03 | −0.198179E+00 |
| −0.102095E−02 | 0.758884E−03 | −0.171692E+00 |
| −0.830969E−03 | 0.837898E−03 | 0.842999E+00 |
| −0.382600E−03 | 0.692939E−03 | 0.162013E+01 |
| 0.165432E−03 | 0.371263E−03 | (Center of filter) |
| COEFFICIENTS FOR FIR FILTER 132 | | |
| 0.355200E−02 | −0.981206E−03 | 0.186788E−02 |
| 0.240900E−02 | −0.164200E−02 | 0.343094E−02 |
| 0.952799E−03 | −0.177103E−02 | 0.437810E−02 |
| −0.488934E−03 | −0.146835E−02 | 0.444978E−02 |
| −0.158854E−02 | −0.909655E−03 | 0.392285E−02 |
| −0.201836E−02 | −0.270663E−03 | 0.320826E−02 |
| −0.156998E−02 | 0.272918E−03 | 0.271696E−02 |
| −0.512028E−03 | 0.580444E−03 | 0.285992E−02 |
| 0.767609E−03 | 0.651537E−03 | 0.384563E−02 |
| 0.188105E−02 | 0.520885E−03 | 0.507281E−02 |
| 0.244042E−02 | 0.223176E−03 | 0.573771E−02 |
| 0.218066E−02 | −0.206904E−03 | 0.503660E−02 |
| 0.132801E−02 | −0.723523E−03 | 0.216572E−02 |
| 0.231535E−03 | −0.123628E−02 | −0.294546E−02 |
| −0.759698E−03 | −0.164363E−02 | −0.743468E−02 |
| −0.129662E−02 | −0.184403E−02 | −0.770647E−02 |
| −0.113920E−02 | −0.173593E−02 | −0.165367E−03 |
| −0.483518E−03 | −0.125842E−02 | 0.161566E−01 |
| 0.365312E−03 | −0.513158E−03 | 0.317173E−01 |
| 0.110218E−02 | 0.357589E−03 | 0.343472E−01 |
| 0.142196E−02 | 0.121154E−02 | 0.177987E−01 |
| 0.111977E−02 | 0.190640E−02 | −0.487542E−03 |
| 0.391541E−03 | 0.232316E−02 | −0.390491E−02 |
| −0.466553E−03 | 0.243578E−02 | −0.287197E−02 |
| −0.115835E−02 | 0.224146E−02 | −0.552863E−02 |
| −0.138769E−02 | 0.173744E−02 | 0.161246E−01 |
| −0.959190E−03 | 0.920919E−03 | 0.571298E−01 |
| −0 805587E−04 | −0.167949E−03 | −0.554412E−01 |
| 0.939710E−03 | −0.131729E−02 | 0.133322E+00 |
| 0.179313E−02 | −0.227229E−02 | −0.213290E+00 |
| 0.217119E−02 | −0.277815E−02 | 0.331735E+00 |
| 0.186322E−02 | −0.258006E−02 | 0.805678E−01 |
| 0.104966E−02 | −0.153128E−02 | 0.590188E−01 |
| 0.876535E−05 | 0.825871E−04 | (Center of filter) |

BOOST FUNCTION FOR BOOSTING CIRCUIT 134

$f_0 = 0.9857174E+00$
$f_1 = -0.8105272E-01$
$f_2 = 0.5838251E-01$
$f_3 = -0.5085912E-01$
$f_4 = 0.2268939E-01$ $f_5 = -0.3034132E - 02$

BOOST FUNCTION FOR BOOSTING CIRCUIT 136

$f_0 = 0.2593778E + 00$
$f_1 = 0.5356264E - 01$
$f_2 = -0.9939796E - 02$
$f_3 = -0.1067168E - 03$
$f_4 = 0.1013864E - 03$
$f_5 = -0.1842084E - 05$

Figure 6:
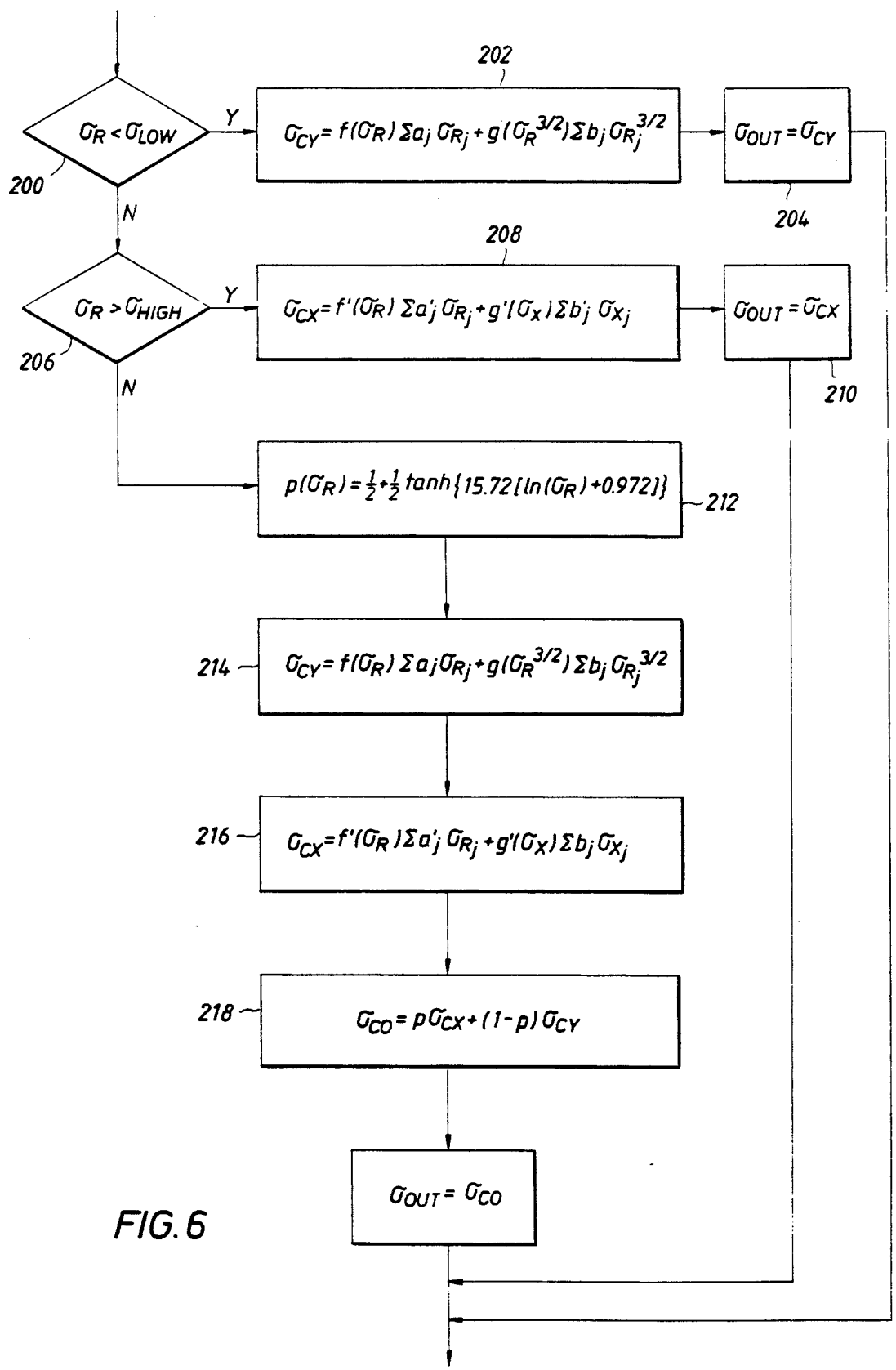
FIG. 6 is a logic flow diagram representing a software implementation of the circuit of FIG. 3.

The functions of the circuits illustrated in FIGS. 3 and 4 are preferably implemented with software in signal processing circuit 12. FIG. 6 is a flow chart illustrating logic flow for processing deep investigation logging signals.

Referring now to FIG. 6, in processing deep investigation signals a determination is made in logic block 200 of whether the zone under investigation is a high resistivity zone. Thus if the apparent measured in-phase conductivity $\sigma_R$ is below a first threshold $\sigma_{LOW}$, indicating a high resistivity zone, control passes to logic block 202 and the logging signals are processed in accordance with Equation 9. Control then passes to logic block 204 wherein $\sigma_{OUT}$ is set equal to $\sigma_{CY}$.

If $\sigma_R$ is not less than $\sigma_{LOW}$ then control passes to logic block 206 wherein a check is made to determined whether the zone under investigation is a low resistivity zone. Thus, if $\sigma_R$ is above a second, higher threshold $\sigma_{HIGH}$, indicating a low resistivity zone, control passes to logic block 208 and the logging signals are processed in accordance with Equation 10. The value of $\sigma_{OUT}$ is then set equal to $\sigma_{CX}$ in logic block 210.

For zones falling in an intermediate conductivity range between $\sigma_{LOW}$ and $\sigma_{HIGH}$, processing control is passed to logic block 212 where an interpolation value is determined for blending the results of both processing schemes. Specifically, a value is determined for the variable p set forth in Equation 11. This value is preferably determined in accordance with Equation 12.

Once a value is determined for the variable p, control passes to logic block 214 and Y-processing conductivity value $\sigma_{CY}$ is determined in accordance with Equation 9. Thereafter, conductivity value $\sigma_{CX}$ is determined in logic block 216 in accordance with Equation 10. Finally, a computed composite conductivity value $\sigma_{CC}$ is determined in logic block 218 in accordance with Equation 11 and the output conductivity signal $\sigma_{OUT}$ is set equal to the composite conductivity value $\sigma_{CC}$.

Logging signals having a medium depth of investigation are processed independently of the X-signal. Specifically, the Y-processing technique is used for processing these logging signals throughout the entire range of formation resistivity. Accordingly, values of $\sigma_R$ from the logging tool are processed in accordance with Equation 9 to obtain values for $\sigma_{CY}$ and $\sigma_{OUT}$ is then set equal to $\sigma_{CY}$. The filter coefficients and boosting functions used in processing the medium depth of investigation logging signals are preferably determined independently of the determination of the filter coefficients and boosting functions used in processing the deep investigation logging signals. Thus, the filter coefficients and boosting functions are likely to differ.

It will be appreciated that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all the changes that come within the meaning and range and equivalents thereof are intended to be embraced therein.

What is claimed is:

1. A method of investigating the conductivity of substrate earth formations with an induction well logging tool in a borehole, comprising the steps of:
   detecting an in-phase conductivity value and a quadrature conductivity value, said in-phase conductivity value and said quadrature conductivity value relating to the conductivity of the earth formation around said borehole;
   filtering said in-phase conductivity value with a first non-linear, spatial filter to obtain a first filtered conductivity value;
   filtering said quadrature conductivity signal with a second non-linear, spatial filter to obtain a first correction value;
   filtering said in-phase conductivity value with a third non-linear, spatial filter to obtain a second filtered conductivity value;
   forming a mathematical function of said in phase conductivity value;
   filtering said formed mathematical function of said in-phase conductivity value with a fourth nonlinear, spatial filter to obtain a second correction value;
   summing said first filtered conductivity value and said first correction value to obtain a first processed conductivity value;
   summing said filtered conductivity value and said second correction value to obtain a second processed conductivity value; and
   determining an output conductivity value as a function of said first processed conductivity value, said second processed conductivity and said in-phase conductivity value.

2. The method of claim 1, wherein each of said first through fourth nonlinear, spatial filters includes a spatial finite impulse response deconvolution filter and a nonlinear boosting function circuit.

3. The method of claim 2, wherein said step of determining an output conductivity value interpolates between said first processed conductivity value and said second processed conductivity value in accordance with said in-phase conductivity value.

4. The method of claim 3, wherein said output conductivity value satisfies $$\sigma_o = p\sigma_{CX} + (1-p)\sigma_{CY}$$

wherein $\sigma_o$ is the output conductivity value, $\sigma_{CX}$ is said first processed conductivity value, $\sigma_{CY}$ is said second processed conductivity value and p is a function of said in-phase conductivity value.

5. The method of claim 4, wherein the value of p varies as a function of said in-phase conductivity value from a value of zero to one, the value of p being zero for small in-phase conductivity values and being one for large in-phase conductivity values, and wherein p changes smoothly but rapidly over a narrow range of said in-phase conductivity values.

6. The method of claim 5, wherein p is determined in accordance with $$p(\sigma_R) = \tfrac{1}{2} + \tfrac{1}{2}\tanh(A[ln(\sigma_R) + B])$$

wherein $\sigma_R$ is said in-phase conductivity value, tanh is the hyperbolic tangent function, and A and B are constants.

7. The method of claim 1, wherein said step of determining an output conductivity value interpolates between said first processed conductivity value and said second processed conductivity value in accordance with said in-phase conductivity value.

8. The method of claim 7, wherein said output conductivity value satisfies $$\sigma_o = p\sigma_{CX} + (1-p)\sigma_{CY}$$

wherein $\sigma_o$ is the output conductivity value, $\sigma_{CX}$ is said first processed conductivity value, $\sigma_{CY}$ is said second processed conductivity value and p is a function of said in-phase conductivity value.

9. The method of claim 8, wherein the value of p varies as a function of said in-phase conductivity value from a value of zero to one, the value of p being zero for small in-phase conductivity values and being one for large in-phase conductivity values, and wherein p changes smoothly but rapidly over a narrow range of said in-phase conductivity values.

10. The method of claim 9, wherein p is determined in accordance with $$p(\sigma_R) = \tfrac{1}{2} + \tfrac{1}{2}\tanh(A - [\ln(\sigma_R) + B9\,])$$

wherein $\sigma_R$ is said in-phase conductivity value, tanh is the hyperbolic tangent function, and A and B are constants.

11. A method for investigating the conductivity of subsurface earth formations from a borehole with an induction logging tool, comprising the steps of:
obtaining a detected in-phase conductivity value from said induction logging tool;
applying a first finite impulse response deconvolution filter to said detected in-phase conductivity value;
boosting said filtered in-phase conductivity value in accordance with said detected in-phase conductivity value to obtain a first boosted value;
forming a mathematical function of said detected in phase conductivity value;
applying a second finite impulse response deconvolution filter to said formed mathematical function of said detected in-phase conductivity value;
boosting said filtered function of said detected in-phase conductivity value in accordance with said function of the detected in-phase conductivity value to obtain a second boosted value;
determining a measured conductivity of the subsurface earth formation as a function of said first boosted value and said second boosted value.

12. The method of claim 11, wherein said conductivity determining step sums said first boosted value and said second boosted value.

13. The method of claim 12, wherein said second finite impulse response deconvolution filter is applied to the formed mathematical function comprising the square root of the cube of said detected in-phase conductivity value.

14. The method of claim 11, wherein said second finite impulse response deconvolution filter is applied to the formed mathematical function comprising the square root of the cube of said detected in-phase conductivity value.

15. An apparatus for investigating the conductivity of subsurface earth formations with an induction well logging tool in a borehole, comprising
means for detecting an in-phase conductivity value and a quadrature conductivity value, said in-phase conductivity value and said quadrature conductivity value relating to the conductivity of the earth formation around said borehole;
a first non-linear, spatial filter for filtering said in-phase conductivity value to obtain a first filtered conductivity value;
a second non-linear, spatial filter for filtering said quadrature conductivity signal to obtain a first correction value;
a third non-linear, spatial filter for filtering said in-phase conductivity value to obtain a second filtered conductivity value;
function forming means for forming a mathematical function of said in phase conductivity value;
a fourth nonlinear, spatial filter for filtering said formed mathematical function of said in-phase conductivity value to obtain a second correction value;
means for summing said first filtered conductivity value and said first correction value to obtain a first processed conductivity value;
means for summing said filtered conductivity value and said second correction value to obtain a second processed conductivity value; and
means for determining an output conductivity value as a function of said first processed conductivity value, said second processed conductivity value and said in-phase conductivity value.

16. The apparatus of claim 15, wherein each of said first through fourth nonlinear, spatial filters includes a spatial finite impulse response deconvolution filter and a nonlinear boosting function circuit.

17. The apparatus of claim 16, wherein said means for determining an output conductivity value includes means for interpolating between said first processed conductivity value and said second processed conductivity value in accordance with said in-phase conductivity value.

18. The apparatus of claim 17, wherein said output conductivity value satisfies $$\sigma_o = p\sigma_{CX} + (1-p)\sigma_{CY}$$

wherein $\sigma_o$ is the output conductivity value, $\sigma_{CX}$ is said first processed conductivity value, $\sigma_{CY}$ is said second processed conductivity value and p is a function of said in-phase conductivity value.

19. The apparatus of claim 18, wherein said interpolating means obtains a value of p which varies as a function of said in-phase conductivity value from a value of zero to one, the value of p being zero for small in-phase conductivity values and being one for large in-phase conductivity values, and wherein the value of p changes smoothly but rapidly over a narrow range of said in-phase conductivity values.

20. The apparatus of claim 19, wherein said interpolating means obtains said value of p in accordance with $$p(\sigma_R) = \tfrac{1}{2} + \tfrac{1}{2}\tanh(A[\ln(\sigma_R) + B])$$

wherein $\sigma_R$ is said in-phase conductivity value, tanh is the hyperbolic tangent function, and A and B are constants.

21. The apparatus of claim 15, wherein said means for determining an output conductivity value includes means for interpolating between said first processed conductivity value and said second processed conductivity value in accordance with said in-phase conductivity value.

22. The method of claim 21, wherein said output conductivity value satisfies $$\sigma_o = p\sigma_{CX} + (1-p)\sigma_{CY}$$

wherein $\sigma_o$ is the output conductivity value, $\sigma_{CX}$ is said first processed conductivity value, $\sigma_{CY}$ is said second processed conductivity value and p is a function of said in-phase conductivity value.

23. The method of claim 22, wherein said interpolating means obtains a value of p which varies as a function of said in-phase conductivity value from a value of zero to one, the value of p being zero for small in-phase conductivity values and being one for large in-phase conductivity values, and wherein the value of p changes smoothly but rapidly over a narrow range of said in-phase conductivity values.

24. The method of claim 23, wherein said interpolating means obtains the value of p in accordance with $$p(\sigma_x) = \tfrac{1}{2} + \tfrac{1}{2}\tanh(A[ln(\sigma_R) + B])$$

wherein $\sigma_R$ is said in-phase conductivity value, tanh is the hyperbolic tangent function, and A and B are constants.

25. An apparatus of investigating the conductivity of subsurface earth formations from a borehole with an induction logging tool, comprising:

means for obtaining a detected in-phase conductivity value from said induction logging tool;

a first finite impulse response deconvolution filter for filtering said detected in-phase conductivity value;

a first boosting circuit for boosting said filtered in-phase conductivity value in accordance with said detected in-phase conductivity value to obtain a first boosted value;

function forming means for forming a mathematical function of said detected in phase conductivity value;

a second finite impulse response deconvolution filter for filtering said formed mathematical function of said detected in-phase conductivity value;

a second boosting circuit for boosting said filtered function of said detected in-phase conductivity value in accordance with said function of the detected in-phase conductivity value to obtain a second boosted value;

means for determining a measured conductivity of the subsurface earth formation as a function of said first boosted value and said second boosted value.

26. The apparatus of claim 25, wherein said means for determining a measured conductivity sums said first boosted value and said second boosted value.

27. The apparatus of claim 26, wherein said function forming means is coupled with said second finite impulse response deconvolution filter and wherein said formed mathematical function of said in-phase conductivity value is the square root of the cube of said detected in-phase conductivity value.

28. The method of claim 25, wherein said function forming means is coupled with said second finite impulse response deconvolution filter and wherein said formed mathematical function of said in-phase conductivity value is the square root of the cube of said detected in-phase conductivity value.

* * * * *